United States Patent
Wu et al.

(10) Patent No.: US 11,914,630 B2
(45) Date of Patent: Feb. 27, 2024

(54) CLASSIFIER DETERMINATION THROUGH LABEL FUNCTION CREATION AND UNSUPERVISED LEARNING

(71) Applicant: PayPal, Inc., San Jose, CA (US)

(72) Inventors: Yang Wu, San Jose, CA (US); Jiadi Xiong, San Jose, CA (US); Yaqin Yang, Santa Clara, CA (US); Dinesh Kumar, San Jose, CA (US)

(73) Assignee: PayPal, Inc., San Jose, CA (US)

(*) Notice: Subject to any disclaimer, the term of this patent is extended or adjusted under 35 U.S.C. 154(b) by 209 days.

(21) Appl. No.: 17/491,149

(22) Filed: Sep. 30, 2021

(65) Prior Publication Data

US 2023/0102892 A1   Mar. 30, 2023

(51) Int. Cl.
*G06F 16/35* (2019.01)
*G06F 18/214* (2023.01)
*G06F 18/2415* (2023.01)
*G06F 40/30* (2020.01)
*G06K 9/62* (2022.01)
*G06N 20/00* (2019.01)

(52) U.S. Cl.
CPC ........ *G06F 16/355* (2019.01); *G06F 18/2155* (2023.01); *G06F 18/2415* (2023.01); *G06F 40/30* (2020.01); *G06N 20/00* (2019.01)

(58) Field of Classification Search
CPC . G06N 20/00; G06F 18/2155; G06F 18/2415; G06F 40/237; G06F 16/355
See application file for complete search history.

(56) References Cited

U.S. PATENT DOCUMENTS

| | | | | |
|---|---|---|---|---|
| 10,503,833 | B2* | 12/2019 | Andrassy | G06F 40/295 |
| 11,585,671 | B1* | 2/2023 | Wu | G06N 20/00 |
| 2017/0286396 | A1* | 10/2017 | Sandor | G06F 16/2455 |
| 2018/0063172 | A1* | 3/2018 | Yamada | H04L 63/1433 |
| 2018/0285745 | A1* | 10/2018 | Lu | G06N 20/00 |
| 2019/0347429 | A1* | 11/2019 | Jean-Louis | G06N 5/022 |
| 2020/0410401 | A1* | 12/2020 | Oh | G06F 16/24578 |
| 2021/0089722 | A1* | 3/2021 | Iwayama | G06F 40/247 |
| 2021/0271718 | A1* | 9/2021 | Agarwal | G06F 16/2474 |
| 2021/0304736 | A1* | 9/2021 | Kothari | G10L 15/26 |
| 2021/0398660 | A1* | 12/2021 | Golenski | G06F 21/602 |
| 2022/0198339 | A1* | 6/2022 | Zhao | G06F 18/214 |
| 2022/0414122 | A1* | 12/2022 | Li | G06N 3/0475 |

* cited by examiner

*Primary Examiner* — Etienne P Leroux
(74) *Attorney, Agent, or Firm* — Kowert, Hood, Munyon, Rankin & Goetzel, P.C.; Gareth M. Sampson; Dean M. Munyon

(57) ABSTRACT

Software architectures relating to machine learning (e.g., relating to classifying sequential text data. Unlabeled sequential text data may be produced by a variety of sources such as text messages, email messages, message chats, social media applications, and web pages. Classifying such data may be difficult due to the freeform and unlabeled nature of text data from these sources. Thus, techniques for training a machine learning algorithm to classify unlabeled text data in freeform format. Training is based on generation of labelling functions from lexical databases, applying the labelling functions to unlabeled text data in an unsupervised manner, and generating trained classifiers that accurately classify the unlabeled text data. The trained classifiers may then be implemented classify text data accessed from the variety of sources. The present techniques provide high-quality and efficient labeling of unlabeled text data in freeform formats.

20 Claims, 8 Drawing Sheets

```
┌─────────────────────────────────────────────────────────────┐
│  Access a first dataset that includes a plurality of first  │
│         unlabeled text data in a freeform format            │
│                          702                                │
└─────────────────────────────────────────────────────────────┘
                              │
                              ▼
┌─────────────────────────────────────────────────────────────┐
│  Apply text data category labels to one or more portions    │
│  of the first dataset by applying one or more classifiers   │
│  to the plurality of first unlabeled text data in the first │
│  dataset using a transformer-based machine learning         │
│               algorithm on the computer system              │
│                          704                                │
└─────────────────────────────────────────────────────────────┘
                              │
                              ▼
┌─────────────────────────────────────────────────────────────┐
│            The one or more classifiers are generated by:    │
│ (a) generating one or more labelling functions for a        │
│ plurality of text data categories where the one or more     │
│ labelling functions are generated based on contextual       │
│ patterns for the plurality of text data categories;         │
│ (b) accessing a second dataset that includes a plurality    │
│ of second unlabeled text data in the freeform format;       │
│ (c) determining a set of probabilistic labels for the       │
│ plurality of text data categories by applying the generated │
│ labelling functions to the second unlabeled text data using │
│ an unsupervised machine learning algorithm; and             │
│ (d) generating the one or more classifiers for the          │
│ transformer-based machine learning algorithm by applying    │
│ the set of probabilistic labels to the second unlabeled     │
│ text data in the transformer-based machine learning         │
│ algorithm.                                                  │
│                          706                                │
└─────────────────────────────────────────────────────────────┘
```

FIG. 7

CLASSIFIER DETERMINATION THROUGH LABEL FUNCTION CREATION AND UNSUPERVISED LEARNING

BACKGROUND

Technical Field

This disclosure relates generally to software architecture improvements for machine learning, including methods of annotating text data and more particularly determining text data categories for text data in freeform or unknown formats, according to various embodiments.

Description of the Related Art

Large amounts of text data are available electronically from numerous sources. In various instances, annotating (e.g., labelling) of text data is useful for privacy or data security concerns. For example, sections of text data can be labeled with categories that identify whether text in the sections may represent a data security issue. Annotation of large amounts of text data, though, can be a cumbersome, tedious, and time-consuming process. Applicant recognizes that computer system functionality and efficiency can be improved via mechanisms for labelling text data from various sources and provides solutions discussed herein.

BRIEF DESCRIPTION OF THE DRAWINGS

FIG. 7 is a flow diagram illustrating a method for classifying unlabeled text data, according to some embodiments.

Figure 1:
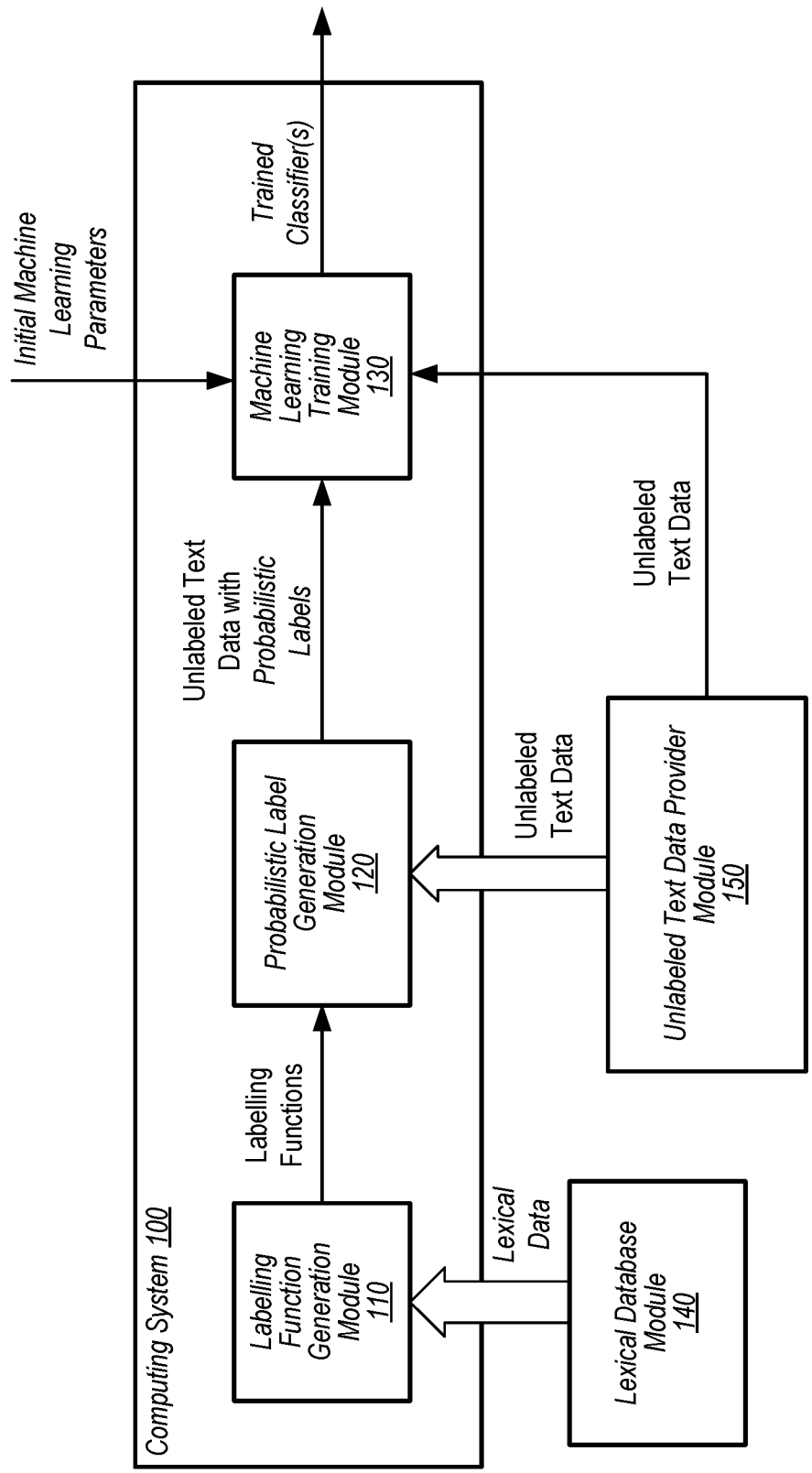
FIG. 1 is a block diagram of a system for generating classifiers that classify text data into text data categories, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques related to the categorization (e.g., annotation) of text data. Text data may be produced by a wide variety of data sources including web pages (such as Wikipedia), social media applications (such as Twitter), text messaging, emails, or chat messages (such as customer service chats). Text data from these different sources may be in a variety of unorganized, freeform formats without any characterization or labelling of the text data. Categorization of such text data may be useful in a variety of applications to provide data privacy or data security. For instance, in data privacy or data security applications, sensitive or personalized data can be identified by categorization. The sensitive or personalized data can then be removed (e.g., masked or redacted) to avoid sharing of private or sensitive information. In some applications, categorization may be used to identify biased text data (e.g., text data with personal bias). For example, text data related to personal statement categories such as politics, religion, or other sensitive data may be identified by categorization techniques. The categorized data may then be removed from customer service chats or other text-based communications in order reduce the potential of bias during the interaction.

In order for data to be removed during online interactions (such as customer service interactions) or other real-time interactions, the categorization (and subsequent masking) of text data needs to be accomplished on a fast time-scale to minimize delays during the interaction. Many current solutions for categorizing (e.g., annotating) text data, however, are tedious or time consuming so that they are not suitable for real-time applications. For example, regular expression scanners (sometimes referred to as lexical analyzers) may apply a ruleset to text data in order to identify patterns of text data and categorize the data. The rulesets in regular expression scanners are, however, typically large, which makes them unsuitable for real-time applications or large amounts of text data. Additionally, the rulesets may need to be updated as lexicon changes over time, which may also be time consuming.

Machine learning algorithms may also be applied for categorizing (e.g., annotating) text data. Training a machine learning algorithm capable of high-quality categorization of text data may, however, be a cumbersome and user-intensive process. For example, the process of training a machine learning algorithm may involve providing large sets of annotated text data for the machine learning algorithm to learn to produce high-quality prediction results. Annotated (e.g., labelled) text data is typically provided by manual annotation of text data. Manually labelling data, however, is expensive and time consuming, especially for the large sets of data needed to train fast machine learning algorithms that produce high-quality results (e.g., label predictions). Additionally, manual annotation is usually limited to provide a ground truth option (such as annotating a 0 for or 1 to the text data to indicate a category status). Providing simple ground truths during training of a machine learning algorithm may increase the training time and/or reduce the quality of predictions made by the machine learning algorithm.

The present disclosure contemplates various techniques for training machine learning algorithms to provide fast and high-quality categorization of text data. Additionally, the present disclosure contemplates various techniques for training machine learning algorithms that are scalable and flexible for a variety of text data categories. One embodiment described herein has three broad components: 1) generating labelling functions for text data categories based on the extraction of contextual patterns from a lexical database of semantic relations between words, 2) determining a set of probabilistic labels for a dataset of unlabeled text data in a freeform format by applying the generated labelling functions to the unlabeled text data using an unsupervised machine learning algorithm, and 3) generating classifiers for a transformer-based machine learning algorithm by applying the probabilistic labels to the unlabeled text data in the transformer-based machine learning algorithm.

The following is a brief example of the application of the techniques disclosed herein for training a machine learning algorithm. In the example, there are six text data categories of interest: gender, health, political, race, religion, and biometrics. Contextual patterns and semantic meanings for each of these six categories are then extracted from a lexical database (such as WordNet or another high-quality lexical database). For instance, the lexical database may provide cognitive synonyms of words and example sentences associated with each category. From this information, contextual patterns and semantic meanings may be extracted and used to determine one or more labelling functions for each of the six categories. The labelling functions include rules that define labels according to the categories. There may be more labelling functions than categories as some categories may have more than one labelling function (for instance, due to complexity of defining the category).

The generated labelling functions are then provided to an unsupervised machine learning algorithm such as Snorkel. A database having a large variety of sentences (which may or may not be related to the six categories) is then accessed to generate a dataset of unlabeled text data for the unsupervised machine learning algorithm. For example, a dataset of sentences may be accessed from Wikipedia or another online encyclopedic database to generate the dataset of unlabeled text data. The unsupervised machine learning algorithm then integrates the labelling functions in determining probabilistic labels for the sentences in the dataset. The probabilistic labels define the probabilities of each sentence being in one of the six text data categories. In various implementations, the probabilistic labels may be represented in a matrix. TABLE I below depicts an example of a probabilistic label matrix for three sentences.

TABLE I

| Sentence ID | Race Probability | Gender Probability | Health Probability | Biometric Probability | Political Probability | Religion Probability |
|---|---|---|---|---|---|---|
| 1 | 0.0 | 0.8 | 0.2 | 0.0 | 0.0 | 0.0 |
| 2 | 0.7 | 0.3 | 0.0 | 0.0 | 0.0 | 0.0 |
| 3 | 0.1 | 0.0 | 0.9 | 0.0 | 0.0 | 0.0 |

Application of the unsupervised machine learning algorithm to the unlabeled text data generates labeled text data where the text data is labelled (e.g., annotated) with the probabilistic labels. The text data and the probabilistic labels are then provided to another machine learning algorithm (e.g., a transformer-based machine learning algorithm such as BERT (Bidirectional Encoder Representations from Transformers)) for training of the machine learning algorithm. The transformer-based machine learning algorithm may be pretrained (e.g., preloaded) with predetermined classifiers as starting points. Inputting the text data along with the probabilistic labels allows the transformer-based machine learning algorithm to refine itself (e.g., train itself) to classify the text data based on the probabilistic labels. The training process generates (refined/trained) classifiers that may be used to classify text data input into the algorithm into one of the six text data categories.

The trained classifiers may then be implemented by the transformer-based machine learning algorithm (or another transformer-based machine learning algorithm) in a classification process on text data from any source (such as chat messages, email messages, text messages, social media applications, etc.). Output for the text data may also be in a matrix showing probabilities for each category. TABLE II below depicts an example of a classification output matrix for three sentence examples: (1) "She is the most streamed female artist and is currently the most followed solo female artist."; (2) "A member of the Democratic Party, she served as a United States Senator from State from 2017 to 2021, and as the attorney general of State from 2011 to 2017."; and (3) "As there was virtually no evidence against them, they were convicted by juries based on their confessions."

TABLE II

| Sentence ID | Race Probability | Gender Probability | Health Probability | Biometric Probability | Political Probability | Religion Probability |
|---|---|---|---|---|---|---|
| 1 | 0.000 | 0.998 | 0.000 | 0.001 | 0.000 | 0.001 |
| 2 | 0.000 | 0.000 | 0.000 | 0.000 | 0.998 | 0.000 |
| 3 | 0.213 | 0.184 | 0.205 | 0.099 | 0.199 | 0.100 |

In short, the present inventors have recognized the benefits of determining labelling functions from large sets of high-quality text data with contextual patterns and applying the labelling functions to an unsupervised learning algorithm that operates on a dataset of example sentences to generate high-quality annotated data for training a transformer-based machine learning algorithm. The transformer-based machine learning algorithm may then be trained to provide fast and accurate classification of sequential text data from any source. In various embodiments, the trained transformer-based machine learning algorithm may be implemented in real-time applications such as text messaging or chat messaging. Implementation of the trained transformer-based machine learning algorithm in real-time applications may reduce the need for manual oversight in such applications and provide increased accuracy over manual oversight. Additionally, the trained transformer-based machine learning algorithm may reduce or eliminate the need for manual review of large sets of data to identify privacy-sensitive data or security-sensitive data for masking or redaction. Reducing or eliminating the need for manual review may increase the efficiency of identifying and masking or redacting privacy-sensitive data or security-sensitive data in large sets of data or real-time interactions.

FIG. 1 is a block diagram of a system for generating classifiers that classify text data into text data categories, according to some embodiments. In the illustrated embodiment, computing system 100 includes labelling function generation module 110, probabilistic label generation module 120, and machine learning training module 130. As used herein, the term "computing system" refers to any computer system having one or more interconnected computing devices. Note that generally, this disclosure may include various examples and discussion of techniques and structures within the context of a "computer system." Note that all these examples, techniques, and structures are generally applicable to any computing system that provides computer functionality. The various components of computing system 100 (e.g., computing devices) may be interconnected. For instance, the components may be connected via a local area network (LAN). In some embodiments, the components may be connected over a wide-area network (WAN) such as the Internet.

In various embodiments, labelling function generation module 110 accesses lexical data from lexical database module 140. Lexical database module 140 may include any lexical database containing words and semantic relations between words. For instance, the lexical database may include words (e.g., nouns, verbs, adjectives, and adverbs) that are grouped into sets of cognitive synonyms. As an example, the word "dog" may be grouped with "canine", "carnivore", placental", and "mammal". The lexical database may also provide example sentences for each word in the database. In certain embodiments, the lexical database includes annotations for the groupings of words. In one embodiment, lexical database module 140 includes a lexical database such as WordNet®.

Figure 2:
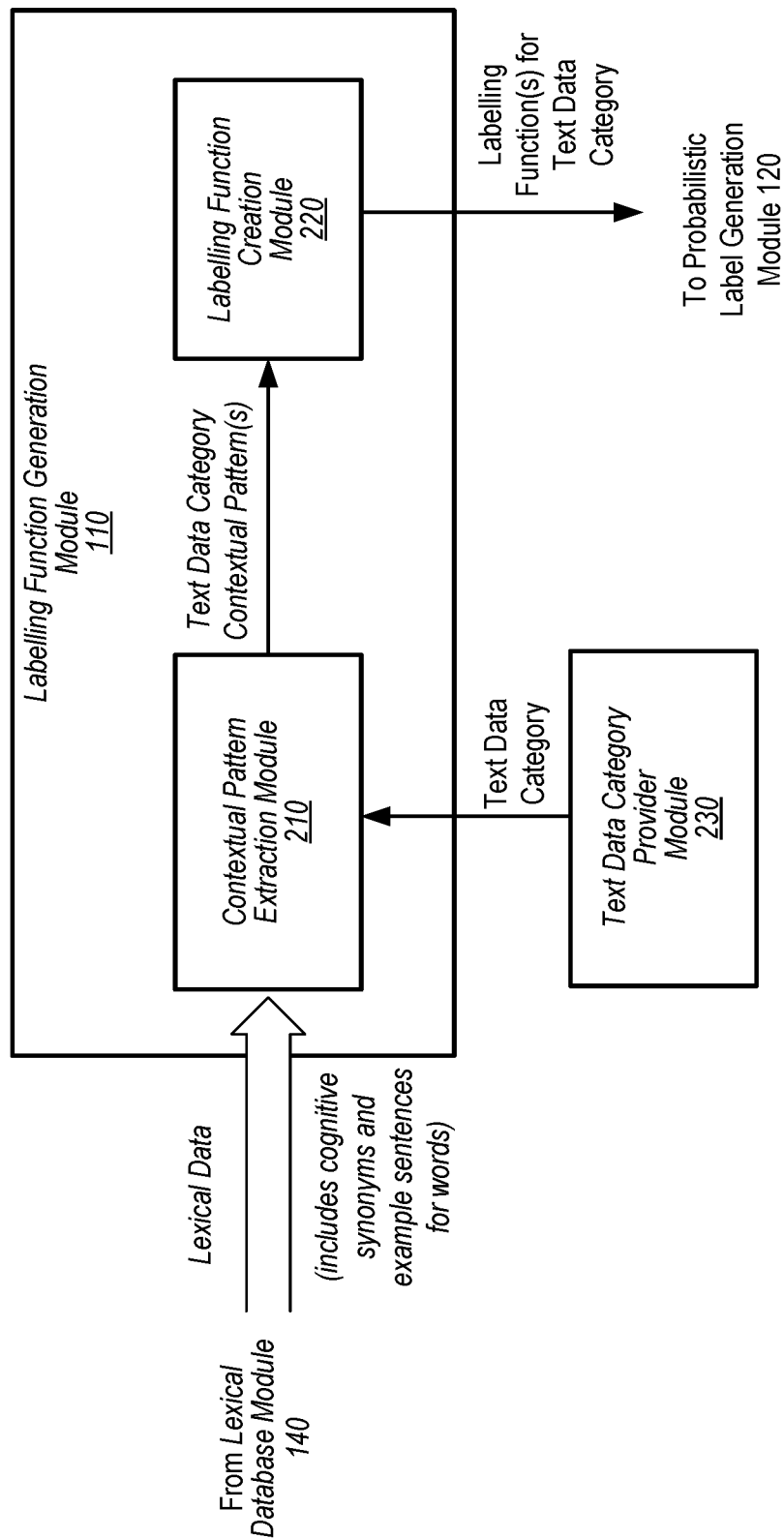
FIG. 2 is a block diagram of a labelling function generation module, according to some embodiments.

FIG. 2 is a block diagram of labelling function generation module 110, according to some embodiments. In the illustrated embodiment, labelling function generation module 110 includes contextual pattern extraction module 210 and labelling function creation module 220. In certain embodiments, a text data category is provided to contextual pattern extraction module 210 from text data category provider module 230. As used herein, the term "text data category" refers to a class or division defining a portion of text data wherein the class or division is based on particular shared characteristics in the portion of text data. The text data category may be, for example, a class or division of interest to a particular user or a particular computing system. Examples of text data categories include, but are not limited to, gender, health, political, race, religion, and biometrics.

After a text data category is received by contextual pattern extraction module 210, the contextual pattern extraction module accesses lexical database module 140 to obtain lexical data associated with the text data category. For instance, contextual pattern extraction module 210 may access cognitive synonyms and example sentences for the word describing the text data category. After obtaining the lexical data for the text data category, contextual pattern extraction module 210 may extract contextual patterns from the example sentences obtained for the text data category. In some embodiments, extracting contextual patterns includes understanding semantic meanings and contextual patterns of a text data category based on the example sentences. In some embodiments, the lexical data undergoes lemmatization before contextual patterns are extracted from the data.

The extracted contextual patterns are then provided to labelling function creation module 220, as shown in FIG. 2. Labelling function creation module 220 may generate one or more labelling functions for the text data category. As used herein, the term "labelling function" refers to a function that applies a label, which defines a text data category, to text data based on contextual patterns in the text data. The labelling functions may include, for example, a rule or a set of rules that defines labels according to the text data category. In certain embodiments, a labelling function applies rules to differentiate between sentences that belong in a text data category and sentences that do not belong in a text data category. For example, the extraction of contextual patterns may provide understanding of differentiation between various sentences. Accordingly, the sentence—"I was a member of the conservative party"—would have different contextual and semantic meaning than the sentence—"I was at a party"

as the first sentence is a personal statement sentence (e.g., a statement of a personal nature) and the second sentence is a general statement sentence (e.g., a statement of a general or factual nature). Thus, applying an accurate labelling function would label the first sentence as "political" (e.g., the first sentence would be in the "political" text data category) while not putting the "political" label on the second sentence (e.g., the labelling function "abstains" from providing a label).

In some embodiments, more than one labelling function may be created for a text data category. For example, a text data category may be complex to define and necessitate multiple sets of rules being applied at different levels to determine whether a portion of text data belongs to the text data category. The illustrated embodiment of FIG. 2 depicts the generation of labelling functions for a single text data category. It should be understood that labelling function generation module 110 may be implemented for multiple text data categories to generate labelling functions that correspond to each text data category. For example, in the brief example described above, there are six text data categories. Accordingly, labelling function generation module 110 may generate one or more labelling functions for each of the six text data categories, which may then be output to probabilistic label generation module 120, as shown in FIG. 1.

Figure 3:
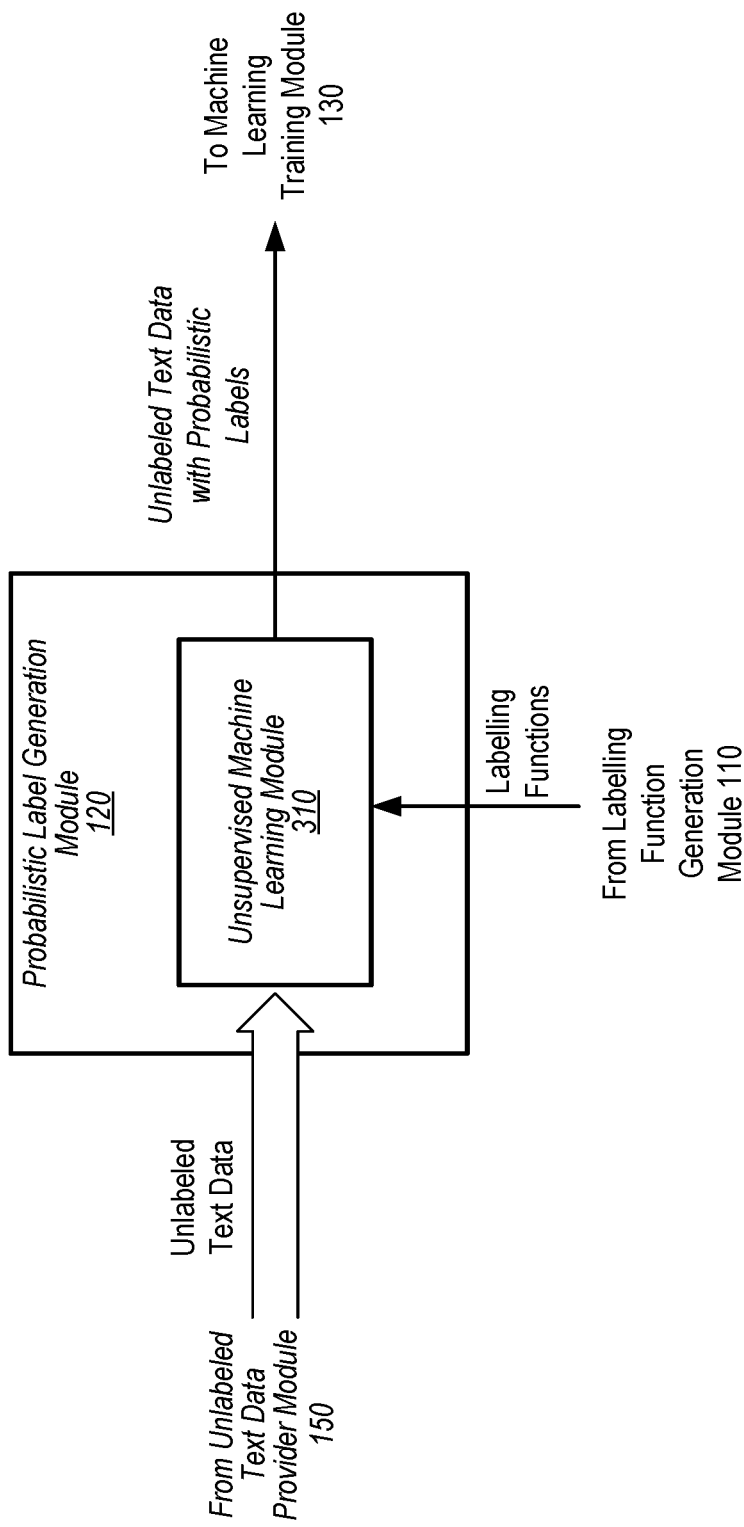
FIG. 3 is a block diagram of a probabilistic label generation module, according to some embodiments.

Turning back to FIG. 1, the labelling functions generated by labelling function generation module 110 are provided to probabilistic label generation module 120, which may annotate (e.g., label) unlabeled text data with probabilistic labels determined for the unlabeled text data based on the labelling functions. FIG. 3 is a block diagram of probabilistic label generation module 120, according to some embodiments. In the illustrated embodiment, probabilistic label generation module 120 includes unsupervised machine learning module 310. In certain embodiments, unsupervised machine learning module 310 implements an unsupervised (or weakly supervised) machine learning algorithm. As used herein, the term "unsupervised machine learning algorithm" refers to a machine learning algorithm that generates predictions without any truths (e.g., labels or labelled data) being provided to the algorithm. A weakly supervised machine learning algorithm may generate predictions for a large set of data with a limited number of truths, which may be noisy or imprecise, being provided to the algorithm (e.g., most of the input data is unlabeled). An example of an unsupervised machine learning algorithm is Snorkel.

In the illustrated embodiment, unsupervised machine learning module 310 applies the labelling functions to unlabeled text data accessed from unlabeled text data provider module 150 (shown in FIG. 1). Unlabeled text data provider module 150 may be, for example, a database of unlabeled sentences or sentence fragments. For example, in one contemplated embodiment, unlabeled text data provider module 150 is Wikipedia or another online encyclopedic database. Wikipedia or a similar database may have a large number of sentence examples that may or may not be categorized into one of the text data categories.

In certain embodiments, the unlabeled text data provided to unsupervised machine learning module 310 is in a freeform format. As used herein, the term "freeform format" is used in relation to text data to refer to text data having any sequential combination (or sequential arrangement) of words in an unspecified format. For example, text data in a freeform format may include any sequential combination of words that form a sentence or a sentence fragment having sequential text data. In various embodiments, unlabeled text data provided to unsupervised machine learning module 310 includes sequential text data. As used herein, the term "sequential text data" refers to text data that appears sequentially in a set of text data. Examples of sequential text data include a sentence of words or a sentence fragment of multiple words. Thus, in some embodiments, unlabeled sequential text data is provided as input to unsupervised machine learning module 31.

In various embodiments, unsupervised machine learning module 310 applies the labelling functions to the unlabeled [sequential] text data to generate probabilistic labels for the unlabeled text data. As used herein, the term "probabilistic label" refers to a probability that unlabeled text data belongs to a text data category. The probability is typically a fractional number between 0 (0% probability) and 1 (100% probability). In certain embodiments, unsupervised machine learning module 310 annotates the unlabeled text data with the probabilistic labels generated (e.g., the unsupervised machine learning module 310 outputs unlabeled text data with probabilistic labels annotated to the data). As described above, a probabilistic label defines probabilities of a portion of unlabeled text data (e.g., a sentence or sentence fragment) being placed into one of the text categories. Accordingly, with multiple text data categories, a probabilistic label for a portion of unlabeled text data includes the probabilities of the portion being placed into each of the multiple text data categories as determined by the labelling functions applied by unsupervised machine learning module 310. For example, with six text data categories, a probabilistic label for a sentence includes six probabilities (one for each text data category). Thus, for a large data set of multiple portions of unlabeled text data (e.g., multiple sentences and/or sentence fragments), a matrix of probabilistic labels may be generated (such as shown in TABLE I above).

Figure 4:
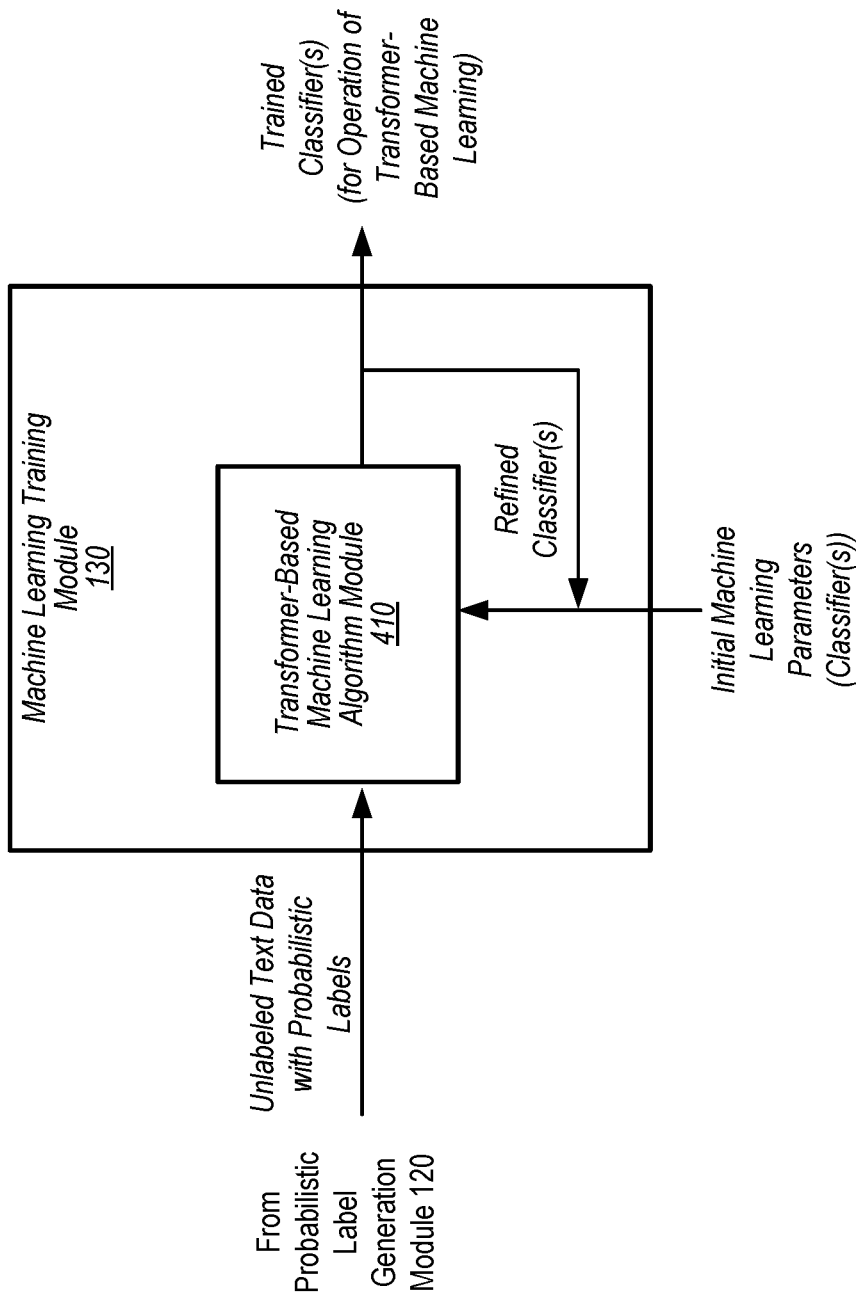
FIG. 4 is a block diagram of a machine learning training module, according to some embodiments.

In various embodiments, as shown in FIGS. 1 and 3, the unlabeled text data with probabilistic labels is output from probabilistic label generation module 120 to machine learning training module 130. FIG. 4 is a block diagram of machine learning training module 130, according to some embodiments. In the illustrated embodiment, machine learning training module 130 includes transformer-based machine learning algorithm module 410. As used herein, the term "transformer-based machine learning algorithm" refers to a machine learning algorithm that generates predictions by differentially weighing various parts of the input data. An example of a transformer-based machine learning algorithm is BERT (Bidirectional Encoder Representations from Transformers) from Google®.

In certain embodiments, transformer-based machine learning algorithm module 410 receives unlabeled text data with probabilistic labels from probabilistic label generation module 120 and tunes (e.g., refines) itself to generate one or more trained classifiers for classifying unlabeled text data. In some embodiments, transformer-based machine learning algorithm module 410 begins its training by implementing one or more predetermined classifiers that are part of initial machine learning parameters provided to the transformer-based machine learning algorithm module 410. These initial machine learning parameters may be starting points for refinement of the classifier(s) implemented by transformer-based machine learning algorithm module 410.

In various embodiments, transformer-based machine learning algorithm module 410 may implement various steps of encoding, embedding, and applying functions to fine tune (e.g., "train") itself and refine its classifier(s) to provide accurate predictions of categories for the unlabeled text data with probabilistic labels that have been input into the transformer-based machine learning algorithm module 410. After one or more refinements of the classifier(s), the one or more trained classifiers may be output (e.g., accessed) from transformer-based machine learning algorithm module 410. These trained classifiers may then be implemented by transformer-based machine learning algorithm module 410 or another transformer-based machine learning algorithm (such as a machine learning algorithm implemented on another computing system) to classify unlabeled text data.

Figure 5:
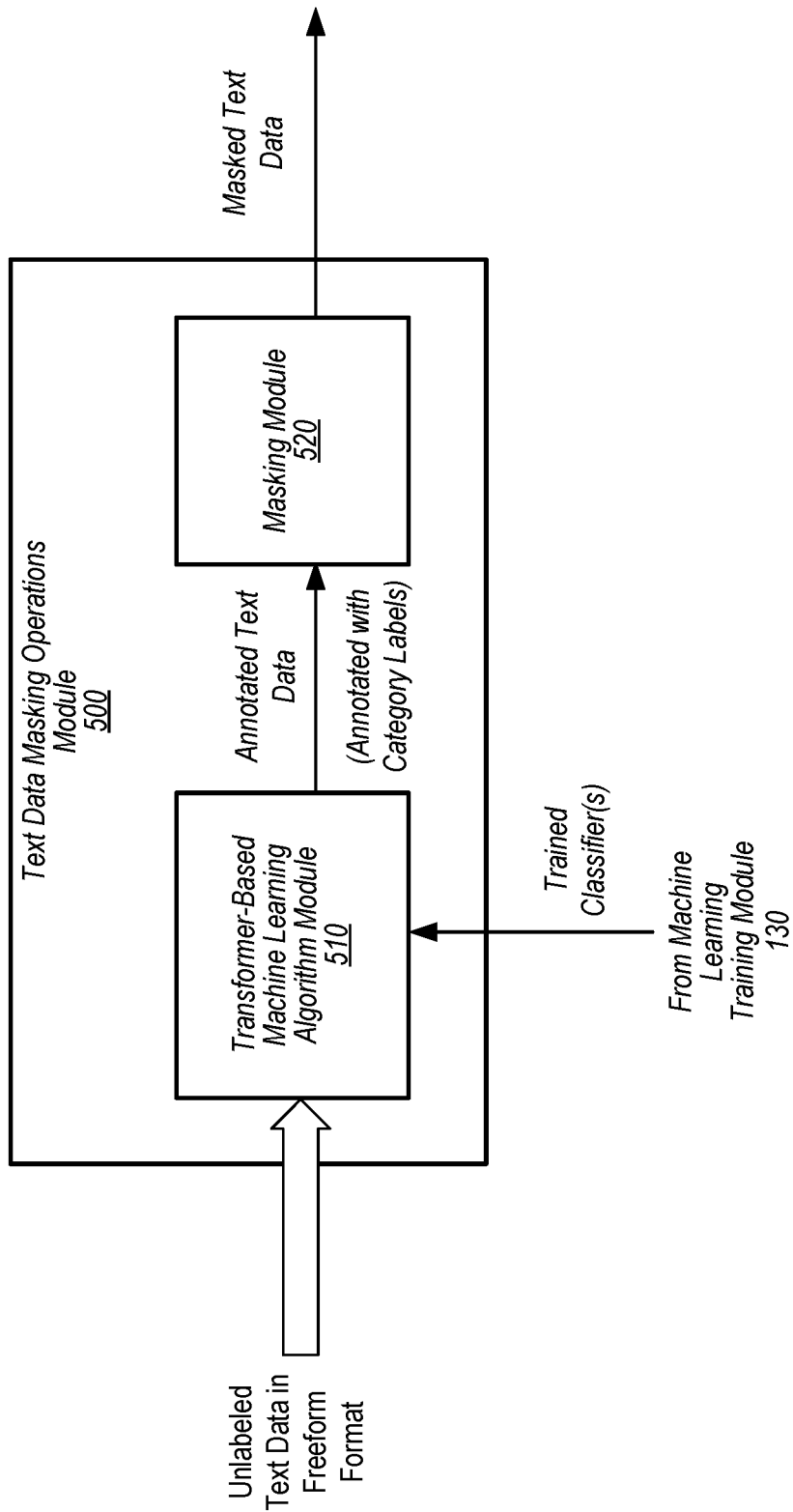
FIG. 5 is a block diagram of a text data masking operations module, according to some embodiments.

FIG. 5 is a block diagram of text data masking operations module 500, according to some embodiments. In various embodiments, text data masking operations module 500 processes unlabeled text data to determine whether to mask or redact text data. For example, text data masking operations module 500 may be implemented in web pages, social media applications, text messaging, emails, chats (such as customer service chats) to determine whether any data being shared between users should be masked or redacted. Masking or redacting of text data may be useful for maintaining data privacy or data security in applications that may share personally-sensitive data or security-sensitive data. In some implementations, masking or redacting of text may be useful to reduce bias in an interaction between two parties. For instance, during a customer service conversation, personal statements that may cause bias by one party or the other may be masked or redacted. Other implementations for text data masking operations module 500 may also be considered where the text data masking operations module 500 is implemented to provide masking or redaction of text data.

In the illustrated embodiment, text data masking operations module 500 includes transformer-based machine learning algorithm module 510 and masking module 520. Transformer-based machine learning algorithm module 510 receives unlabeled text data in a freeform format from any source (such as an online computer system or other online system). For example, as described herein, the unlabeled text data may be from web pages, social media applications, text messaging, emails, chats, etc. Transformer-based machine learning algorithm module 510 may apply the trained classifier(s) from machine learning training module 130 (shown in FIG. 4) to classify portions of the unlabeled text data. Portions of the unlabeled text data that may be classified include sentences, sentence fragments, or any other sequential text data provided as input to transformer-based machine learning algorithm module 510.

In certain embodiments, as shown in FIG. 5, transformer-based machine learning algorithm module 510 outputs annotated text data as a result of the classification of the unlabeled text data. The annotated text data output includes the unlabeled text data input annotated with text data category labels. The text data category labels available for annotation of the unlabeled text data correspond to the text data category labels implemented by computing system 100 during training of transformer-based machine learning algorithm 410. For example, the trained classifier(s) classify the unlabeled text data according to the text data category labels implemented by computing system 100 during training.

In various embodiments, the annotated text data output may be in the form of a matrix for unlabeled text data with multiple sentences or sentence fragments. For instance, as described herein, the annotated text data output may be in the format of a matrix showing probabilities for each text data category (similar to the matrix of probabilities shown in TABLE II above). As shown in FIG. 5, the annotated text data output may be provided to masking module 520. Masking module 520 may assess the annotated text data and determine whether sequential text data portions (e.g., sentences or sentence fragments) of the unlabeled text data in the annotated text data should be masked or redacted.

In some embodiments, masking module 520 masks or redacts a sequential text data portion based on the sequential text data portion being labelled with at least one of the text data categories (with some minimum level of probability for the text data category). Such embodiments may be implemented when all of the text data categories correspond to personal statement text data categories. For example, a sequential text data portion may be masked if any of the probabilities for any of the text data categories are above a predetermined level (such as 0.9 or higher) since all the text data categories correspond to personal statement categories.

In other contemplated embodiments, masking module 520 masks a sequential text data portion based on the sequential text data portion having a probability above a predetermined level for one or more specific categories. For instance, if the text data categories include the six text data categories in the example described above, the sequential text data portion may be masked when, for example, the sequential text data portion has a text data category label probability above the predetermined level for either political or religion. Thus, if the text data category label probability is above a predetermined level for any of the other categories (such as gender, biometrics, etc.), the sequential text data portion is not masked.

Other embodiments of masking decisions implemented by masking module 520 may also be contemplated without deviating from the scope of the current disclosure. For example, in one contemplated embodiment, masking of a portion of sequential text data may be determined based on a combination of text data category label probabilities for two or more categories. As further examples, a hierarchical algorithm, a conditional algorithm, or a rule-based algorithm may be applied to the text data category label probabilities to determine whether to mask a portion of sequential text data.

Example Methods

Figure 6:
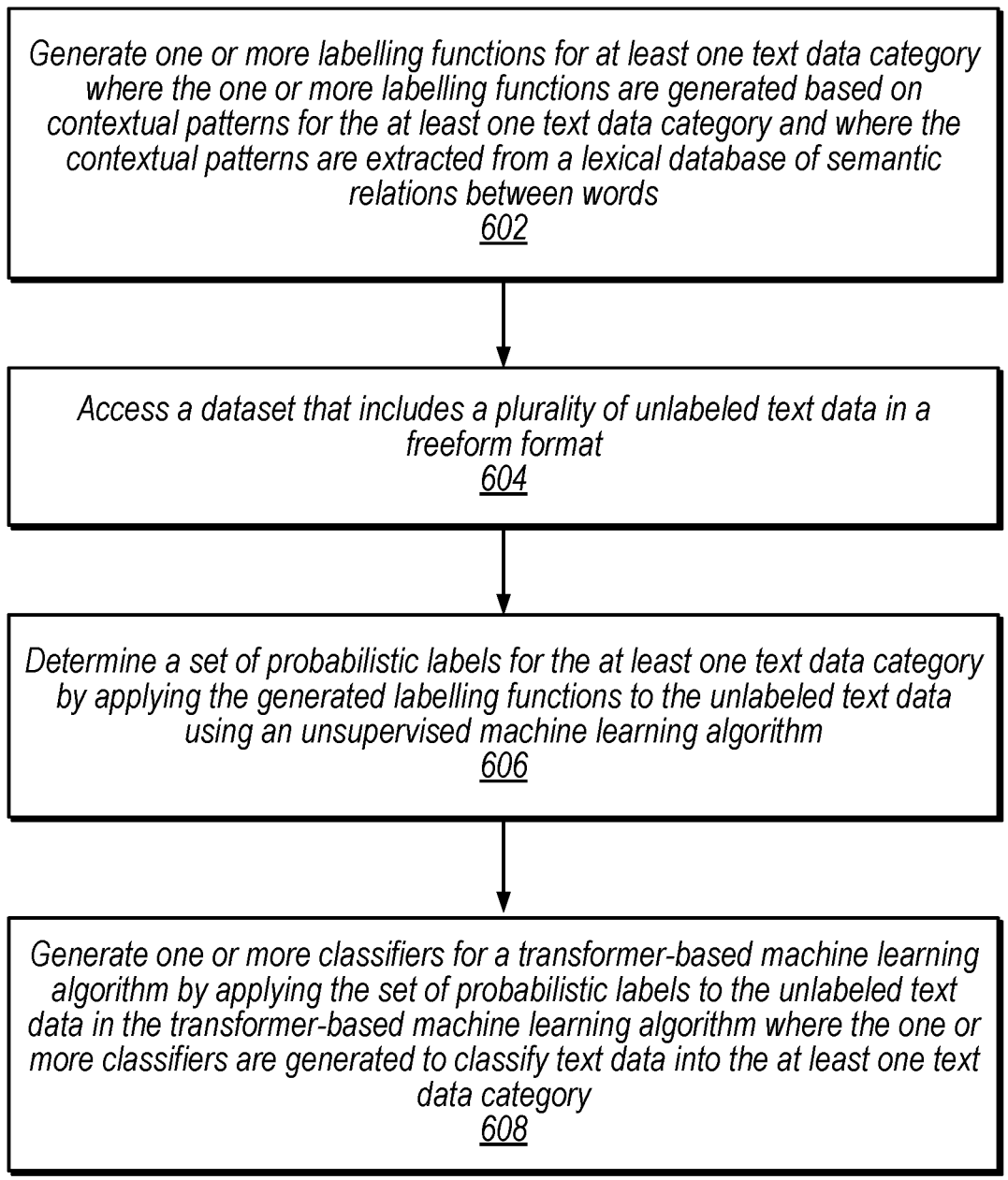
FIG. 6 is a flow diagram illustrating a method for training a machine learning algorithm to classify unlabeled text data, according to some embodiments.

FIG. 6 is a flow diagram illustrating a method for training a machine learning algorithm to classify unlabeled text data, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 810, described below.

At 602, in the illustrated embodiment, a computer system generates one or more labelling functions for at least one text data category where the one or more labelling functions are generated based on contextual patterns for the at least one text data category and where the contextual patterns are extracted from a lexical database of semantic relations between words.

In some embodiments, at least one of the labelling functions is a function that applies at least one label to the text data based on contextual patterns and semantic meanings in the text data. In some embodiments, the contextual patterns are extracted from words grouped into sets of cognitive synonyms and example sentences for the words in the lexical database. In some embodiments, at least one of the labelling functions includes a set of rules that, when applied to the text data, determines whether a statement of the text data is of personal statement data. In some embodiments, the set of rules includes one or more rules about words in the statement and contextual information in the statement. In some embodiments, the at least one text data category is selected from a set of personal statement categories.

At 604, in the illustrated embodiment, the computer system accesses a dataset that includes a plurality of unlabeled text data in a freeform format. In some embodiments, the unlabeled text data in the freeform format includes text data with any sequential combination of words.

At 606, in the illustrated embodiment, the computer system determines a set of probabilistic labels for the at least one text data category by applying the generated labelling functions to the unlabeled text data using an unsupervised machine learning algorithm. In some embodiments, at least one of the probabilistic labels is a fractional number corresponding to a probability that sequential text data in the unlabeled text data belongs to the at least one text data category. In some embodiments, determining the set of probabilistic labels includes applying rules from the one or more labelling functions to the unlabeled text data. In some embodiments, applying the generated labelling functions to the unlabeled text data using the unsupervised machine learning algorithm includes applying the generated labelling functions in a machine learning algorithm without any truths.

In some embodiments, the unlabeled text data includes a plurality of text sentences where the set of probabilistic labels is a matrix of label probabilities for the text sentences. In some embodiments, a label probability is a probability that a text sentence is in the at least one text data category.

At 608, in the illustrated embodiment, the computer system generates one or more classifiers for a transformer-based machine learning algorithm by applying the set of probabilistic labels to the unlabeled text data in the transformer-based machine learning algorithm where the one or more classifiers are generated to classify text data into the at least one text data category. In some embodiments, generating the one or more classifiers includes: providing the unlabeled text data along with the set of probabilistic labels to the transformer-based machine learning algorithm where the transformer-based machine learning algorithm has one or more predetermined classifiers and training the transformer-based machine learning algorithm to classify the unlabeled text data based on the set of probabilistic labels by refining the one or more predetermined classifiers.

In some embodiments, the first computing device that the authentication process is associated with a man-in-the-middle attack based on the subsequent authentication step being inhibited. In some embodiments, the first computing device permits the subsequent authentication step to be performed on the first computing device in response to the assessed trust factor satisfying a specified threshold. In some embodiments, the first computing device transmits, to the service computer system, an indication of the determination of whether to permit the subsequent authentication step to be performed on the first computing device.

FIG. 7 is a flow diagram illustrating a method for classifying unlabeled text data, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 810, described below.

At 702, in the illustrated embodiment, a computer system accesses a first dataset that includes a plurality of first unlabeled text data in a freeform format. In some embodiments, the first dataset includes text data accessed from one or more of the following sources: text messages, email messages, message chats, social media applications, and web pages.

At 704, in the illustrated embodiment, the computer system applies text data category labels to one or more portions of the first dataset by applying one or more classifiers to the plurality of first unlabeled text data in the first dataset using a transformer-based machine learning algorithm on the computer system. In some embodiments, applying text data category labels to the one or more portions of the first dataset includes annotating the portions of the first dataset with a probability for at least one text data category label determined by the one or more classifiers. In some embodiments, at least one text data category label includes a personal statement text data category label indicating that text data is a personal statement and the computer system applies the personal statement text data category label to at least one portion of the first dataset. In some embodiments, the computer system redacts or masks the at least one portion with the personal statement text data category label.

At 706, in the illustrated embodiment, the one or more classifiers are generated by: (a) generating one or more labelling functions for a plurality of text data categories where the one or more labelling functions are generated based on contextual patterns for the plurality of text data categories; (b) accessing a second dataset that includes a plurality of second unlabeled text data in the freeform format; (c) determining a set of probabilistic labels for the plurality of text data categories by applying the generated labelling functions to the second unlabeled text data using an unsupervised machine learning algorithm; and (d) generating the one or more classifiers for the transformer-based machine learning algorithm by applying the set of probabilistic labels to the second unlabeled text data in the transformer-based machine learning algorithm.

Example Computer System

Figure 8:
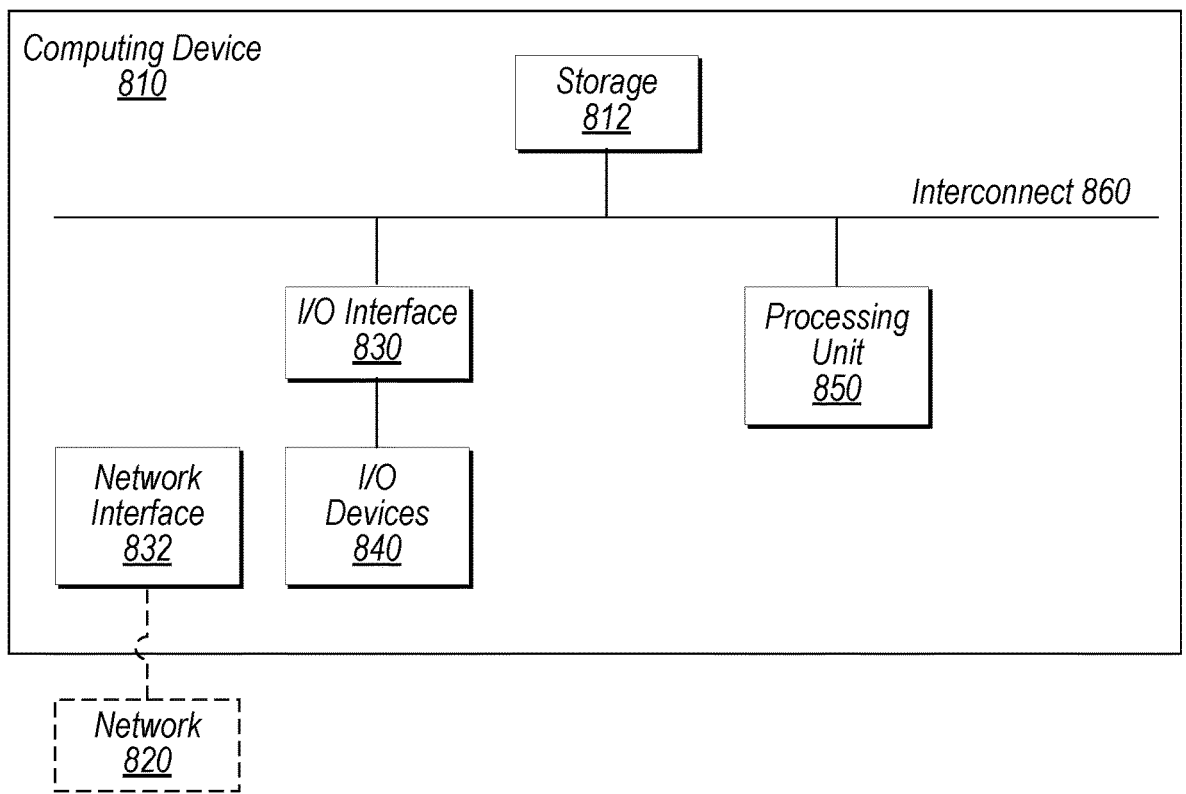
FIG. 8 is a block diagram of one embodiment of a computer system.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 812 is usable by processing unit 850 (e.g., to store instructions executable by and data used by processing unit 850). Storage 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage 812 may consist solely of volatile memory, in one embodiment. Storage 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   generating, by a computer system, one or more labelling functions for at least one text data category, wherein the one or more labelling functions are generated based on contextual patterns for the at least one text data category, and wherein the contextual patterns are extracted from a lexical database of semantic relations between words;
   accessing, by the computer system, a dataset that includes a plurality of unlabeled text data in a freeform format;
   determining, by the computer system, a set of probabilistic labels for the at least one text data category by applying the generated labelling functions to the unlabeled text data using an unsupervised machine learning algorithm;
   providing the unlabeled text data along with the set of probabilistic labels to a transformer-based machine learning algorithm; and
   generating, by the computer system, one or more classifiers for the transformer-based machine learning algorithm by refining one or more predetermined classifiers for the transformer-based machine learning algorithm to classify the unlabeled text based on the set of probabilistic labels, wherein the one or more classifiers are generated to classify text data into the at least one text data category.

2. The method of claim 1, wherein at least one of the labelling functions is a function that applies at least one label to the text data based on contextual patterns and semantic meanings in the text data.

3. The method of claim 1, wherein the contextual patterns are extracted from words grouped into sets of cognitive synonyms and example sentences for the words in the lexical database.

4. The method of claim 1, wherein at least one of the labelling functions includes a set of rules that, when applied to the text data, determines whether a statement of the text data is of personal statement data.

5. The method of claim 4, wherein the set of rules includes one or more rules about words in the statement and contextual information in the statement.

6. The method of claim 1, wherein the at least one text data category is selected from a set of personal statement categories.

7. The method of claim 1, wherein at least one of the probabilistic labels is a fractional number corresponding to a probability that sequential text data in the unlabeled text data belongs to the at least one text data category.

8. The method of claim 1, wherein determining the set of probabilistic labels includes applying rules from the one or more labelling functions to the unlabeled text data.

9. The method of claim 1, wherein applying the generated labelling functions to the unlabeled text data using the unsupervised machine learning algorithm includes applying the generated labelling functions in a machine learning algorithm without any truths.

10. The method of claim 1, wherein the unlabeled text data in the freeform format includes text data with any sequential combination of words.

11. A non-transitory computer-readable medium having instructions stored thereon that are executable by a computing device to perform operations, comprising:
  generating one or more labelling functions for at least one text data category, wherein the one or more labelling functions are generated based on contextual patterns for the at least one text data category, and wherein the contextual patterns are extracted from a lexical database of semantic relations between words;
  accessing a dataset that includes a plurality of unlabeled text data in a freeform format;
  determining a set of probabilistic labels for the at least one text data category by applying the generated labelling functions to the unlabeled text data using an unsupervised machine learning algorithm without any truths; and
  generating one or more classifiers for a transformer-based machine learning algorithm by applying the set of probabilistic labels to the unlabeled text data in the transformer-based machine learning algorithm, wherein the one or more classifiers are generated to classify text data into the at least one text data category.

12. The non-transitory computer-readable medium of claim 11, wherein the unlabeled text data includes a plurality of text sentences, and wherein the set of probabilistic labels is a matrix of label probabilities for the text sentences.

13. The non-transitory computer-readable medium of claim 12, wherein a label probability is a probability that a text sentence is in the at least one text data category.

14. The non-transitory computer-readable medium of claim 11, wherein generating the one or more classifiers includes:
  providing the unlabeled text data and the set of probabilistic labels for the unlabeled text data to the transformer-based machine learning algorithm; and
  refining the transformer-based machine learning algorithm to provide predictions on the unlabeled text data that correspond to the set of probabilistic labels.

15. A method, comprising:
  accessing, by a computer system, a first dataset that includes a plurality of first unlabeled text data in a freeform format; and
  applying text data category labels to one or more portions of the first dataset by applying one or more classifiers to the plurality of first unlabeled text data in the first dataset using a transformer-based machine learning algorithm on the computer system, wherein the one or more classifiers are generated by:
    generating one or more labelling functions for a plurality of text data categories, wherein the one or more labelling functions are generated based on contextual patterns for the plurality of text data categories;
    accessing a second dataset that includes a plurality of second unlabeled text data in the freeform format;
    determining a set of probabilistic labels for the plurality of text data categories by applying the generated labelling functions to the second unlabeled text data using an unsupervised machine learning algorithm with a limited number of truths by having a majority of the second unlabeled text data be unlabeled; and
    generating the one or more classifiers for the transformer-based machine learning algorithm by applying the set of probabilistic labels to the second unlabeled text data in the transformer-based machine learning algorithm.

16. The method of claim 15, wherein applying text data category labels to the one or more portions of the first dataset includes annotating the portions of the first dataset with a probability for at least one text data category label determined by the one or more classifiers.

17. The method of claim 15, wherein at least one text data category label includes a personal statement text data category label indicating that text data is a personal statement, the method further comprising applying the personal statement text data category label to at least one portion of the first dataset.

18. The method of claim 17, further comprising redacting or masking the at least one portion with the personal statement text data category label.

19. The method of claim 15, wherein the first dataset includes text data accessed from one or more of the following sources: text messages, email messages, message chats, social media applications, and web pages.

20. The method of claim 15, wherein generating the one or more classifiers includes:
  providing the unlabeled text data along with the set of probabilistic labels to the transformer-based machine learning algorithm; and
  refining one or more predetermined classifiers to have the transformer-based machine learning algorithm be operable to classify, using the refined one or more predetermined classifiers, the unlabeled text data based on the set of probabilistic labels.

\* \* \* \* \*